INVENTOR
JOSEPH J. vonEDESKUTY
BY William C. Stueber ATTORNEY

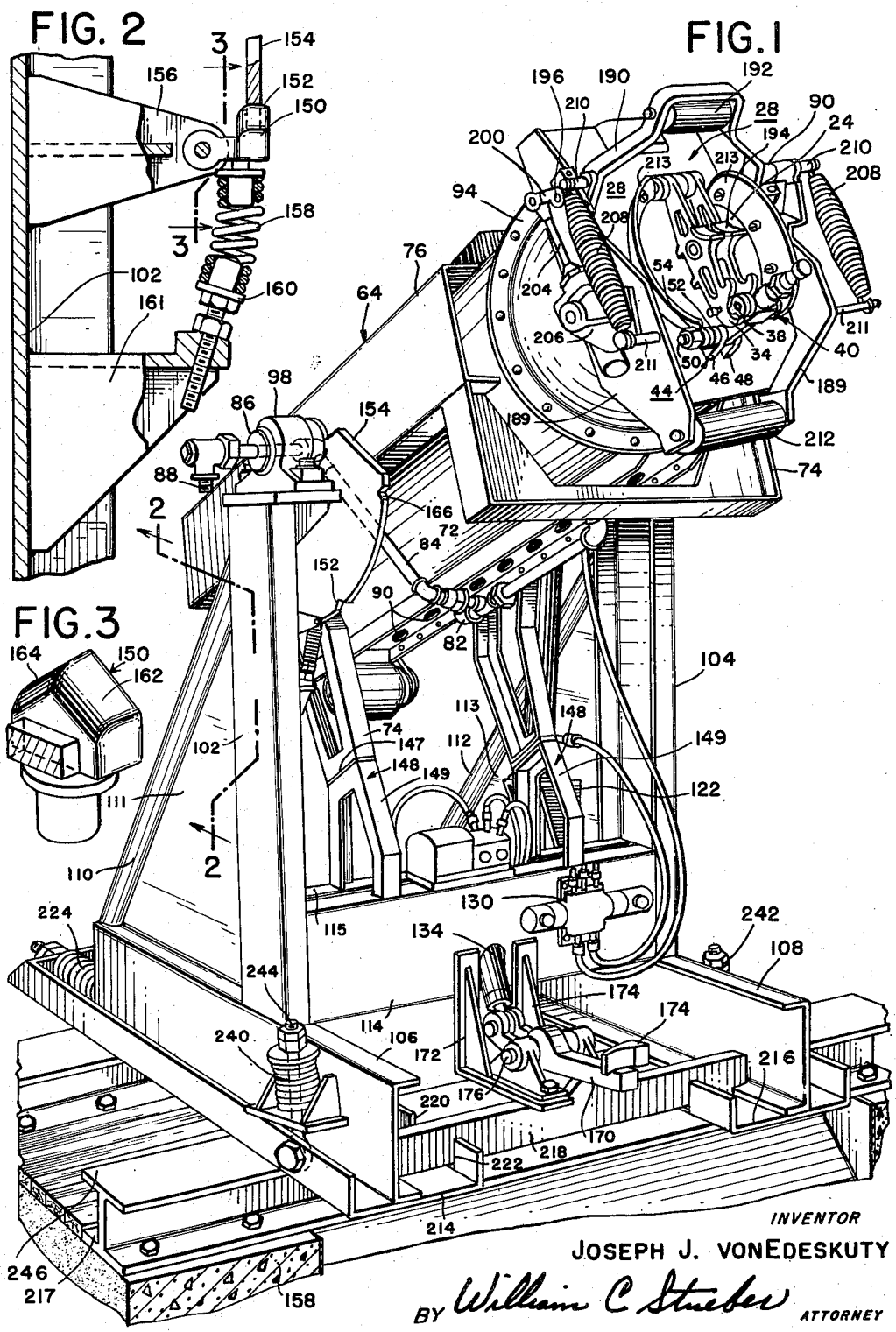

Oct. 15, 1957    J. J. VON EDESKUTY    2,809,576
PUFFING GUN
Filed Nov. 15, 1952    7 Sheets-Sheet 5

INVENTOR
JOSEPH J. VonEDESKUTY
BY William C. Strieber ATTORNEY

Oct. 15, 1957   J. J. VON EDESKUTY   2,809,576
PUFFING GUN
Filed Nov. 15, 1952   7 Sheets-Sheet 6
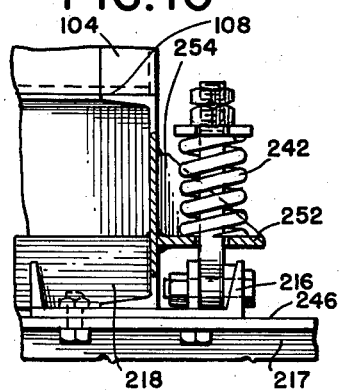
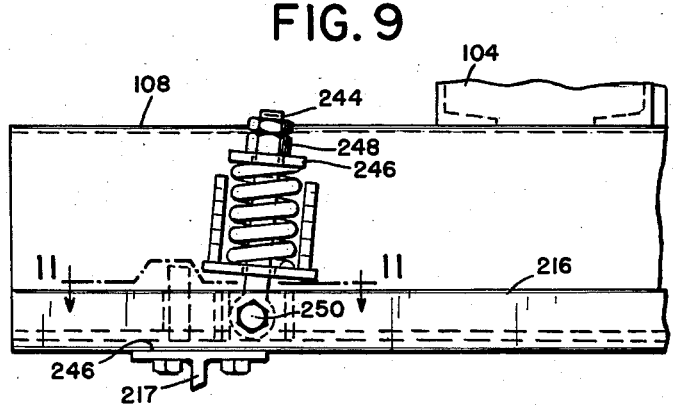
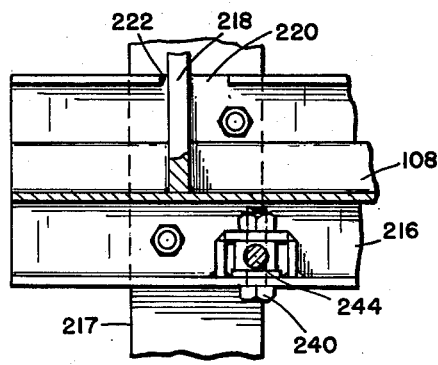
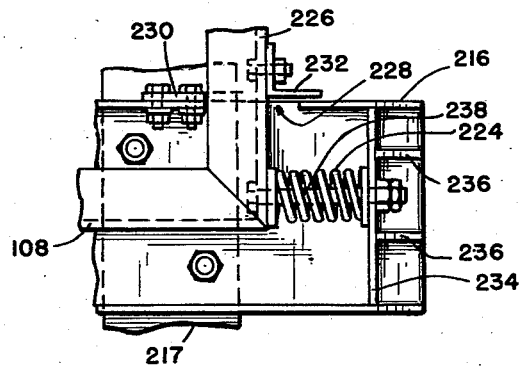
INVENTOR
JOSEPH J. VON EDESKUTY
BY William C. Stueber ATTORNEY Oct. 15, 1957  J. J. VON EDESKUTY  2,809,576
PUFFING GUN
Filed Nov. 15, 1952  7 Sheets-Sheet 7
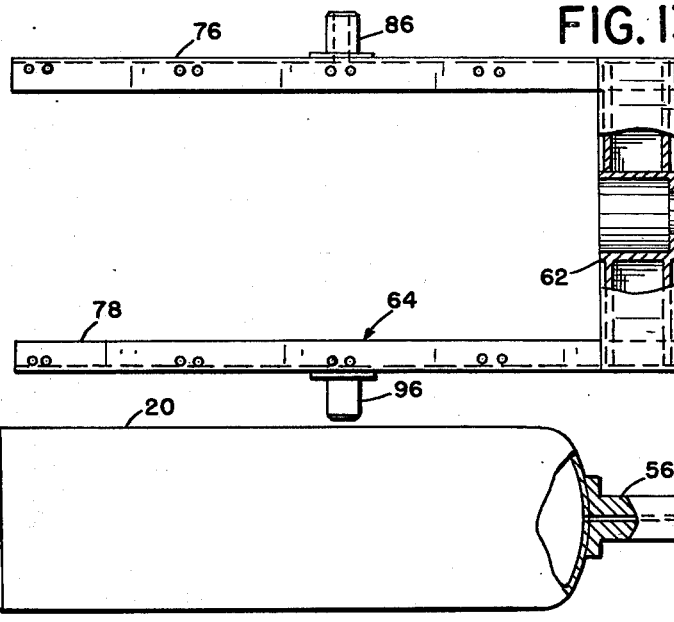
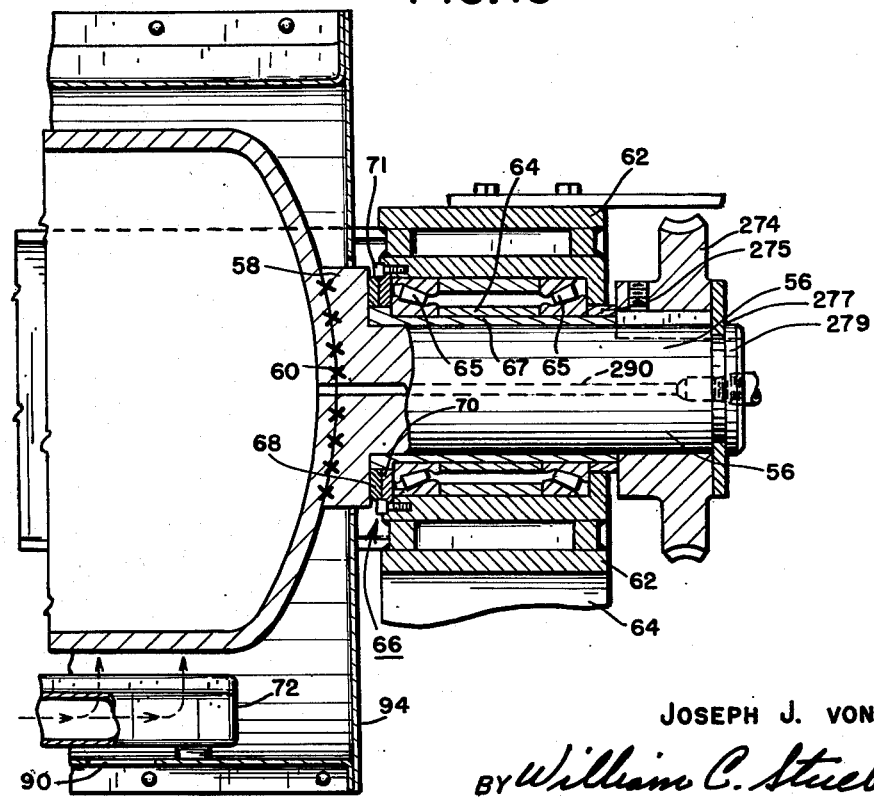
INVENTOR
JOSEPH J. vonEDESKUTY
BY William C. Stieber ATTORNEY United States Patent Office 2,809,576
Patented Oct. 15, 1957

2,809,576
PUFFING GUN

Joseph J. von Edeskuty, Minneapolis, Minn., assignor to General Mills, Inc., a corporation of Delaware Application November 15, 1952, Serial No. 320,763

8 Claims. (Cl. 99—238)

The present invention relates to improvements in mechanism for subjecting products having starch cells to heat and pressure and suddenly releasing the pressure to cause an expansion of the products to many times their normal size. More generally, the invention relates to improvements in mechanisms which are known to the art as puffing guns.

In the process of expanding products having starch cells by the application of heat and pressure and the sudden release of pressure, a device which has been frequently used is the puffing gun. This, usually, consists of a hollow pressure chamber in which the product is placed with the chamber sealed. The heat and pressure are then applied to the product, either by the injection of steam into the interior of the chamber or by the application of heat by means of gas burners or steam to the exterior of the pressure chamber. In the latter case, the steam created from the moisture content of the product creates the pressure within the chamber. To puff the product the pressure is released by opening the chamber to atmosphere, which results in a violent ejection of the product from the chamber as the steam within expands. The violent expansion of steam is accompanied by an explosive noise and stresses created on the chamber due to the violent puffing actions make it necessary to provide relatively strong machine elements for safety. Although other mechanisms are used for puffing, and the gun apparatus requires the succession of steps of loading, closing, heating, pressurizing and releasing for each batch processed, there are many advantages which accrue to the gun type of process including a better product in the case of many types of materials.

In the puffing of products, such as ready-to-eat cereals, efforts have been made to increase the output of the puffing guns both to meet the demand of high consumer quantity requirements and to reduce the cost of production of the cereal. In the co-pending application, Automatic Puffing Gun, Serial No. 268,196, an automatic machine is disclosed which reduces the amount of manual attention which must be given each of the puffing guns and which increases the speed and uniformity of puffing.

Another means of increasing production is to enlarge the size of the gun. The violence of the explosion when the pressure within the gun is released and the strain on the operating parts is, generally, increased proportionally to the size of the puffing gun. Because of the high pressures which must be used and the violence which accompanies the release of pressure for puffing the product, the use of a very large gun has heretofore been impractical. The employment of improved methods of puffing, such as those disclosed in the above-named co-pending application, make it necessary to have automatic parts operative during the time the gun is exploded and thus has heretofore limited the size of the gun because certain operative parts could not stand severe shocks while in operation. Further, certain parts which operate to open the puffing chamber to atmosphere must have very rapid operation and this becomes increasingly difficult to obtain with the increase of size and weight of parts. In the present invention certain novel changes have been made in a puffing gun structure which makes it possible and practical to use a gun of a very large size having an increased capacity.

It is accordingly an object of the invention to provide an improved puffing gun structure which makes it possible to use a puffing gun type of mechanism in the production of puffed products which will operate efficiently and obtain the maximum puffing size from the cereal grain and generally will not sacrifice efficiency of operation with the increase of gun size.

Another object of the invention is to provide a puffing gun capable of being constructed in very large sizes which will stand shock of firing without damaging any of the operating parts or without interfering with the proper and smooth functioning of the various parts.

A still further object of the invention is to provide a puffing gun with an enlarged barrel and a closure lid which will be capable of opening with the consumption of a minimum amount of time so that the pressure drop within the barrel will be instantaneous in order to achieve maximum and uniform puffing of the cereal product.

Another object of the invention is to provide a puffing gun of an increased size and which will insure the thorough and even heating of the entire contents during processing.

A further object of the invention is to provide a puffing gun with a barrel capable of handling an increased amount of contents and a mechanism for changing the operating positions of the barrel smoothly and quickly to reduce operating time and to prevent burning of the contents while changing from processing to discharging position.

Another object of the invention is to provide a puffing gun having a barrel with a hinged closure lid in which the barrel continues rotation while firing and in which the shock-absorbing mechanism for the lid is carried on the rotating barrel.

Other objects and advantages will become apparent in the disclosure of the invention as found in the following specification and claims, taken in connection with the accompanying drawings, in which Figure 1 is a perspective view of an embodiment of the improved puffing gun of the present invention;

Fig. 2 is a sectional view taken along line 2—2 of Fig. 1;

Fig. 3 is a sectional view taken along line 3—3 of Fig. 2;

Figs. 9 and 10 are enlarged detail side and front elevations, respectively, of the front shock-absorbing mechanisms positioned on one of the front corners of the gun assembly;

Fig. 11 is a sectional view taken along line 11—11 of Fig. 9;

Fig. 12 is an enlarged detailed plan view of the shock-absorbing apparatus located at one of the rear corners of the puffing gun assembly;

Fig. 13 is a plan view of the supporting frame for the puffing gun barrel;

Fig. 14 is a detailed plan of the puffing gun barrel which is to be assembled in the frame for operation of the puffing gun; and Fig. 15 is an enlarged detail of the supporting bearing assembly for the puffing gun barrel with a section taken through the bearing.

Figure 4:
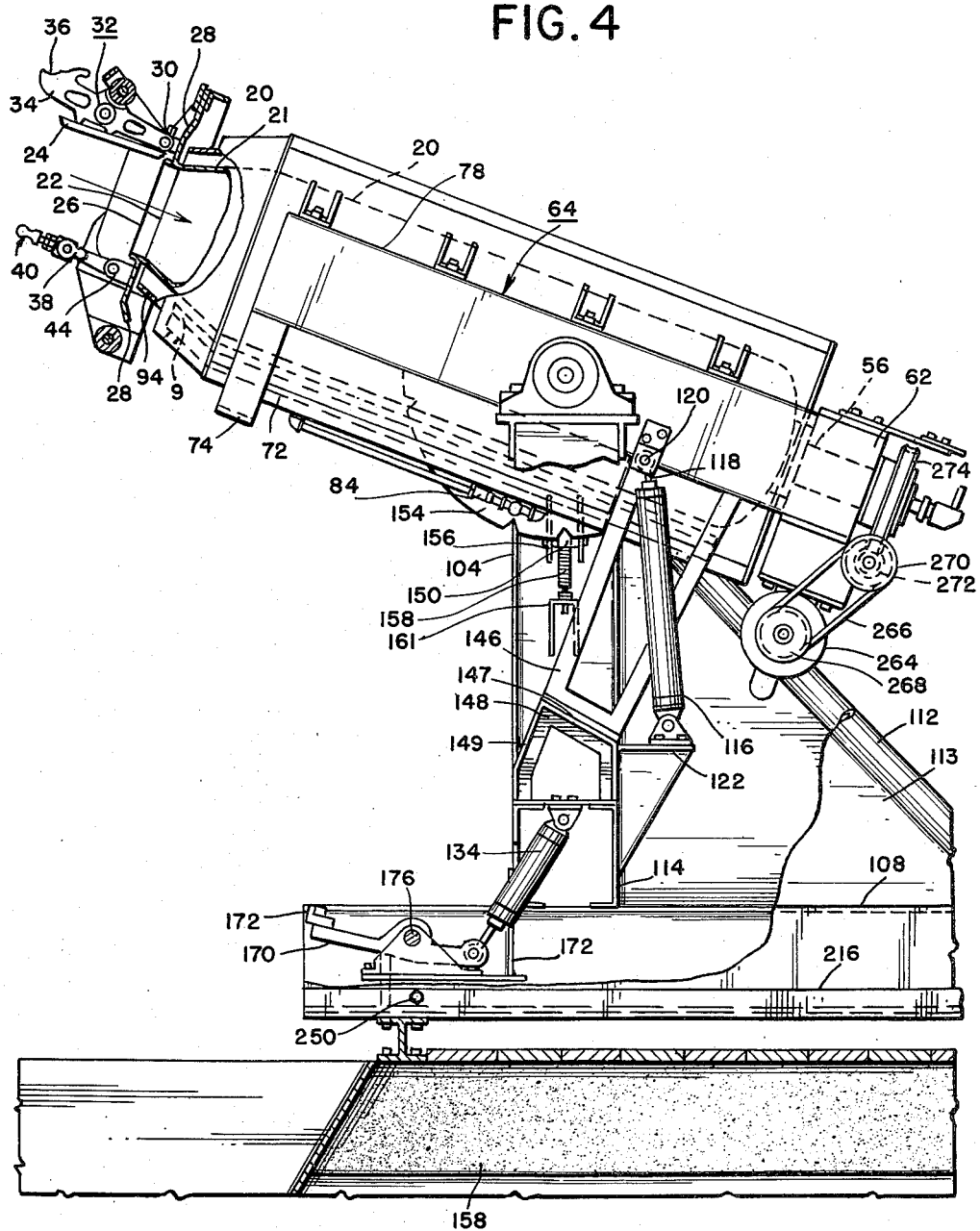
Fig. 4 is a side elevation of the puffing gun shown in filling position with details of certain of the parts omitted for simplicity.

In the present invention one of the prime objectives was to create a puffing gun capable of being built in an enlarged size which would increase capacity and thereby reduce the cost of puffing large amounts of cereal. In the drawings, one embodiment of the invention is shown and the size of the gun and parts shown therein are not to be taken as fully representative or as limiting the relative size of the various gun elements but are shown for purposes of illustration and it will be recognized that the inventive features enable the construction of guns of very large size. In addition to achieving larger quantities of cereals, the quality of cereal produced is of prime importance and it will be recognized that various features of the invention are designed to obtain a puffed product of a high quality.

As shown in Figs. 1 to 6, the puffing gun is comprised of a long cylindrically-shaped pressure chamber or gun barrel 20 in which the cereal product is placed and subjected to heat and pressure during the processing period. Although the machine is capable of processing many types of starch cell products, its primary advantages are best exploitable in the puffing of a foodstuff, such as a cereal grain or a prepared cereal pellet, and for ease of description the product to be puffed will hereinafter be referred to as a cereal product.

Figure 6:
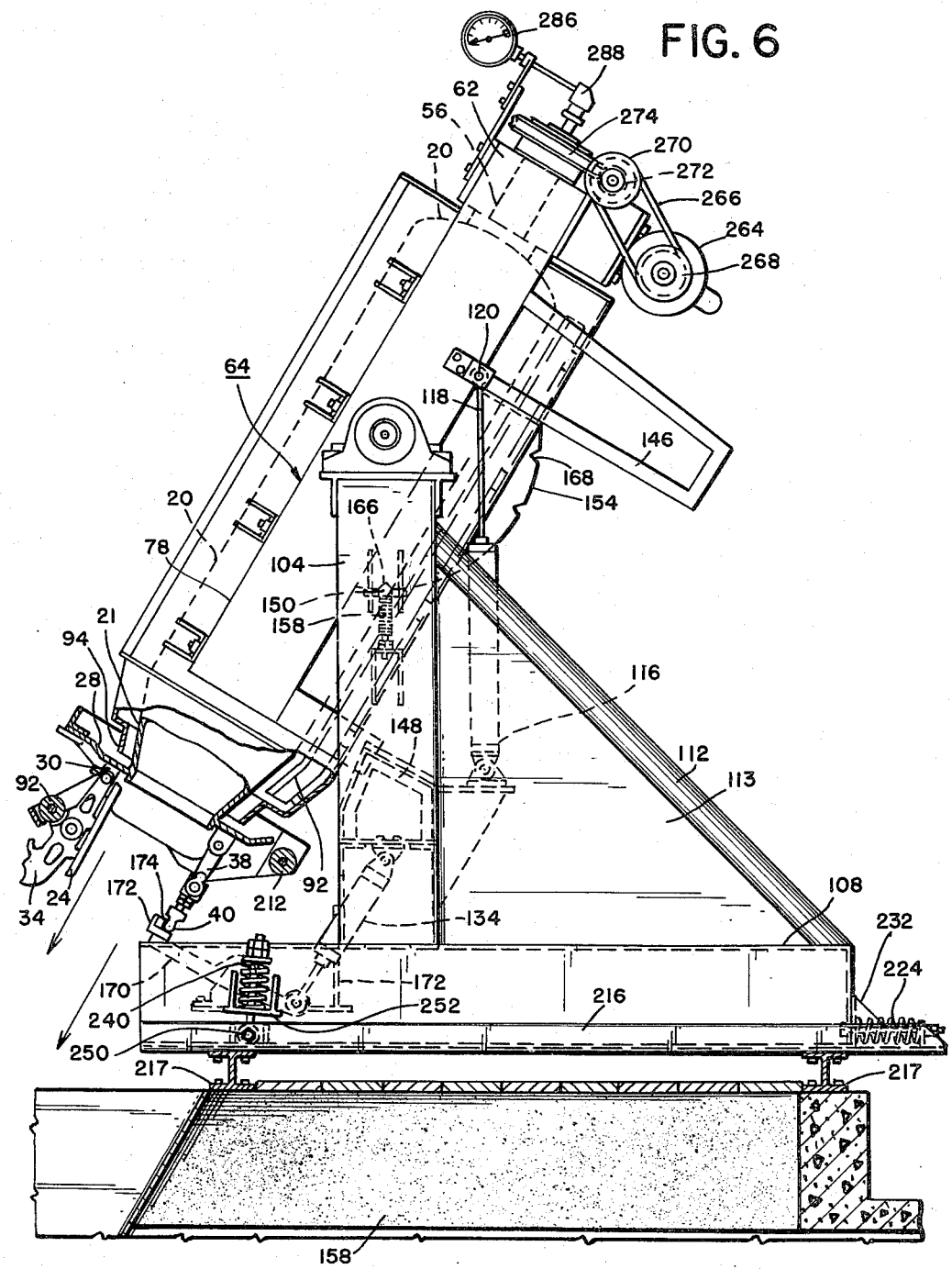
Fig. 6 is a side elevation of the puffing gun shown in discharge or firing position with certain details of the parts being omitted for simplicity.

The puffing gun barrel tapers down at one end 21 to an opening 22 for receiving and discharging the cereal product. To close the opening and maintain the pressure within the gun barrel during processnig a cover or lid 24 is secured over the opening during the processing. The lid is hingedly mounted to be pivotally movable against the opening to close the gun barrel during processing or movable away from the opening to receive the cereal products during filling, such as shown in Fig. 4, or to discharge the cereal products during firing, such as shown in Fig. 6. The opening has at the end of the tapered portion 21 a short annular collar 26 of uniform diameter against which the lid seats. A flange 28 projects from the outer surface of the collar for purposes which will later be explained.

Secured to this flange, as shown in Figs. 4 and 6, is a bracket 30, Fig. 4, to which is pivotally attached a lid supporting yoke 32. The yoke carries over the lid and terminates in a bifurcated end 34 which has a rounded notch 36 to receive a toggle link 38 carried on the latch member 40 for holding the lid closed. The latch member 40 is pivotally carried on a bracket 44 which is secured to the flange 28 opposite the bracket carrying the yoke 32.

The bracket 44 consists of a pair of lugs 46 and 48 (Fig. 1), which project from the flange and which have holes in them to receive a pin 50 which passes through the holes and through a hole in the latch member 40. A spring 52 is positioned between a nut 54 on the end of the pin and one of the lugs 46 to draw the lugs together snugly against the latch member to frictionally restrain its free pivotal movement which prevents it flapping back and forth after the cover has been unlatched and the barrel is still rotating.

The preferred method of building pressure within the pressure chamber 20 is to apply heat to the outer surface of the chamber causing the moisture contents of the cereal product within the chamber to create a steam pressure which builds up within the chamber.

To prevent burning of the cereal products within the chamber while it is being heated, the gun is constantly rotated. To permit this rotation, the gun is rotatably supported at its rear, which is the end opposite the opening, by a projecting shaft 56 which is shown in detail in Figs. 14 and 15. The shaft 56 projects from an enlarged end 58 which is suitably attached to the end of the gun barrel, such as by a weld 60. The shaft is rotatably supported to support the gun barrel in a journal box 62 carried on the U-frame 64 of the puffing gun assembly. The U-frame, Fig. 13, supports the gun barrel and much of the operating mechanism while the barrel is being tilted to various positions. The frame is fabricated from suitable structural iron, such as channel iron, angle iron, etc.

The journal box which is positioned at the midpoint of the rear of the frame contains the bearing for rotatably holding the shaft, which is the sole support of the gun barrel. As shown in the detail drawing of Fig. 15, the box 62 has within it a race 64 containing tapered roller bearings 65. The shaft 56 has a bushing sleeve 67 over its end which fits snugly within the race.

When the gun is fired and the lid opened, there is an extreme axial force exerted due to the reaction of the steam leaving the barrel. To sustain this force and protect the roller bearings which support the gun barrel, a thrust bearing assembly 66 is provided. A thrust bearing ring member 68 is snugly fitted over a shoulder on sleeve 67. The mating thrust bearing ring 70 is secured by bolts 71 to the bearing box on the frame and the axial forces acting rearwardly on firing the gun are thereby transmitted to the main frame protecting the roller bearing from shock. The weight of the gun pressing forward when the gun barrel is tilted downwardly is transmitted from the gear 274 through the ring 275 to be carried by the rear group of the tapered roller bearings 65. The gear 274 is held securely on the shaft by an annular ring 277 held in place by a stud 279 secrewed into the end of the shaft 56 and a set screw 281 prevents the gear from turning on the shaft.

It is to be noted that the roller bearing race used has the rollers substantially separated to withstand the moment due to the weight of the gun barrel. This moment is considerable because the complete barrel is cantilever supported at this bearing, there being no other support along the barrel. By eliminating a bearing support at the front or opening end of the barrel, the necessity of maintaining lubrication, in a difficult to lubricate bearing which is subjected to heat, is eliminated. Further, and more important, by eliminating all of the supports along the barrel, it is possible to heat the barrel from the lower surface throughout the entire length uniformly and evenly without any break between the continuous flame which is applied to the barrel from one end to the other. This is important in a barrel which is elongated and relatively thin to be able to receive adequate heat to heat the product rapidly. To apply the flame to the barrel, a burner 72 (Figs. 1 through 5 and 15) is positioned beneath the barrel being supported within the insulating enclosure for the barrel.

To insulate the barrel and retain the heat transmitted thereto a protective outer enclosure shell is provided which may be of steel or may be made of suitable insulating material. The shell 94 (Figs. 1 and 4) completely surrounds the barrel and is supported between the channel irons 76 and 78. The burner is supported along the lower face of the shell and extends up within it to direct the heat against the barrel, as is shown in Fig. 15. The supporting framework for the shell consists of a fabricated bracket 74 (Fig. 1) extending down from and bridging the front ends of the channel irons 76 and 78 which form the sides of the U-frame (Fig. 1).

Gas is supplied to the burner through a distributor pipe 82 which is fed by a pipe 84 led in through a bore through the trunnion 86 and fed from a supply pipe 88 leading to a suitable source of gas supply. The burner assembly has holes 90 at the bottom to relieve pressure as the burner operates.

It is to be noted that the burner 72 extends the full length of the gun barrel and follows the contour of the tapered end of the barrel by curving upwardly at the forward end 92 in order to supply heat the full length of the barrel. The absence of any front-supporting bearing permits the burner to extend the full length of the barrel and eliminates the need for a heavy bearing ring on the barrel surface which would equalize the transmission of heat through the barrel at that point.

The gun barrel assembly which is supported on the frame 64 is tilted to various operating positions, shown in Figs. 1 through 6. In Figs. 1 and 4, the gun is shown in loading position where the cereal products are inserted into the gun barrel. After insertion, the cover is closed and latched, as shown in Fig. 1, and the gun is subsequently tilted to horizontal position where the cereal product is processed. At the completion of the processing stage, when the pressure within the barrel has reached the desired degree, the gun is tilted to discharging or firing position, shown in Fig. 6, where the lid is released and the interior of the gun vented to atmosphere.

To support the gun carriage, which comprises the barrel assembly with its supporting framework, a pair of trunnions 96 and 86 extends from the side channel irons 78 and 76. These trunnions are journaled in bearings 98 and 100 (100 not being shown) which are mounted at the top of standards 102 and 104. These standards (Fig. 1) are vertically mounted on suitable base members 106 and 108 which are channel irons with the web vertically positioned. Struts 110 and 112 extend slantingly from the end of the base members to the vertical standards to lend additional strength and a web 111 and 113 fills the space between them. A cross member 114 is secured between the lower ends of the standards. Another cross member 115 extends across the rear ends of the base members.

In tilting the gun to the various positions above described, it is to be noted that the gun carriage is well balanced, the center of gravity being substantially coincident with the axis of the trunnions. Considering the weight of the carriage and the gun barrel, which must be of heavy gauge material to withstand high puffing pressures, it will be realized that considerable inertia must be overcome to start and stop the gun when tilted between the various positions. Regardless of this problem, the tilting must be done rapidly, especially in moving the gun between processing and firing position. The necessity for rapid movement between these two positions arises in that when the gun is tilted, lapse of too much time will cause the heat from the metal of the gun barrel to overheat the cereal product and scorch it. Too great a delay may cause the pressure within the barrel to rise above the desired amount and result in a faulty batch being puffed. In order to obtain a smooth and rapid tilting operation, applicant has provided an operating system which is moved by air pressure and which has positive stops at the critical positions. Although the embodiment of the tilting mechanism herein shown is actuated by air pressure a hydraulic fluid operated device may be used. In that case pressurized fluid would be used, controlled by valves and pumps and the adaptation could easily be made as will be recognized by those skilled in the art. Hydraulic fluid is non-compressible and affords many advantages including quick and positive movements.

Figure 5:
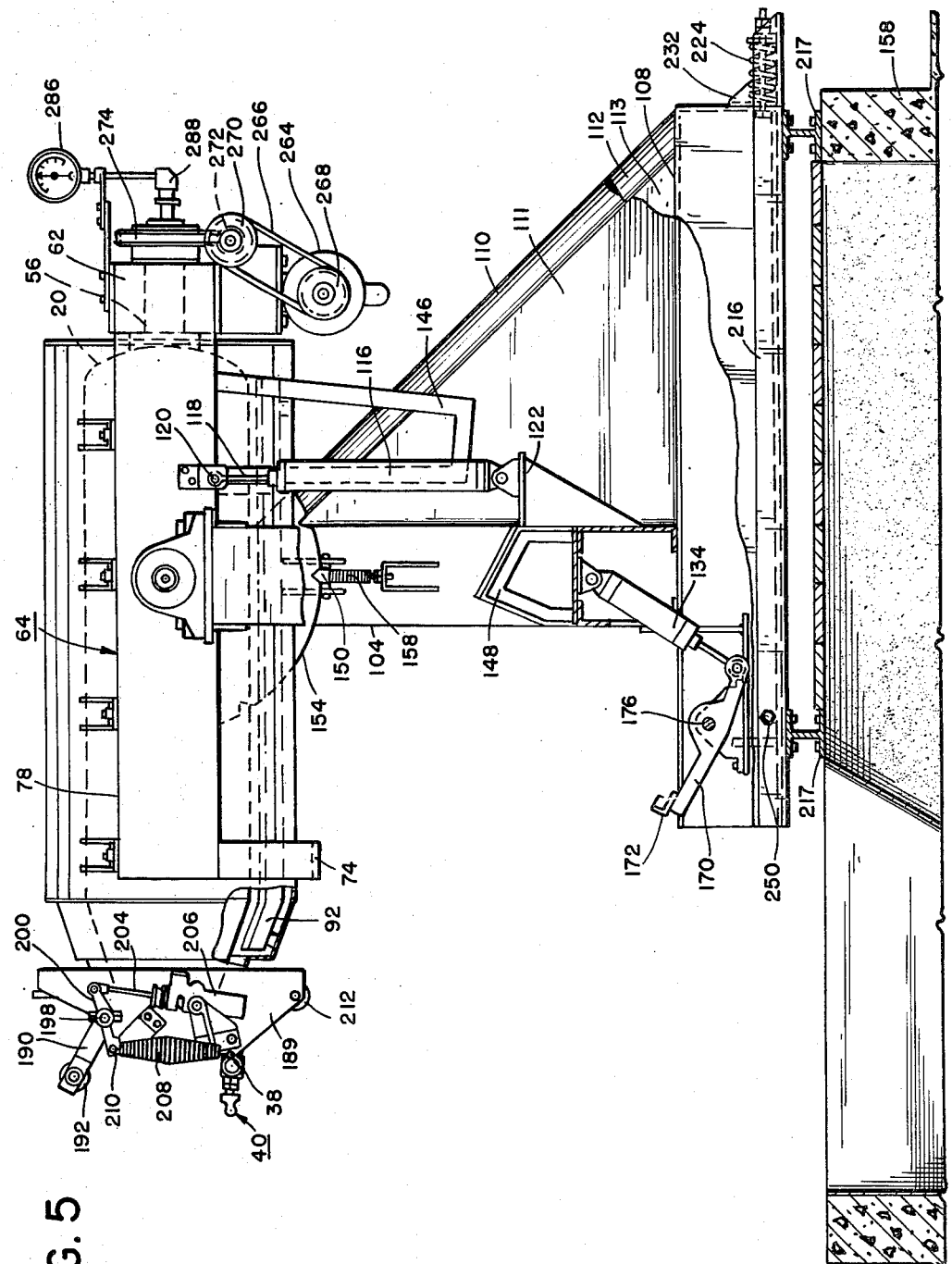
Fig. 5 is a side elevation of a puffing gun shown in processing position with certain details omitted for simplicity.

Referring to Figs. 4 through 6, a pneumatic air cylinder 116 is shown with an operating piston rod 118 which is pivotally attached to a bracket 120 mounted on the puffing gun carrying frame. The cylinder is pivotally mounted on a bracket 122 which is secured on the horizontal member 114. The operation of the tilting air piston is shown in Fig. 8.

The piston is of the double-travel type known to the art, having an air inlet at each end to pneumatically force the plunger 124 in either direction. Air lines 126 and 128 lead to the upper and lower ends of the piston respectively and the air supply to the lines is controlled by an electrical valve 130, Figs. 1 and 8. Air is supplied to the valve through a supply line 132 which also constitutes a supply for the air valve 134 which operates the lid tripping mechanism later to be described. The valve 130 is operated electrically through leads 136 and 138 and the valve operates to either admit pressure to line 126 while venting line 128 to atmosphere or to vent line 126 to atmosphere while admitting pressure to line 128. The valve outlets 140 bleed the valve and vent the lines to atmosphere.

Figure 8:
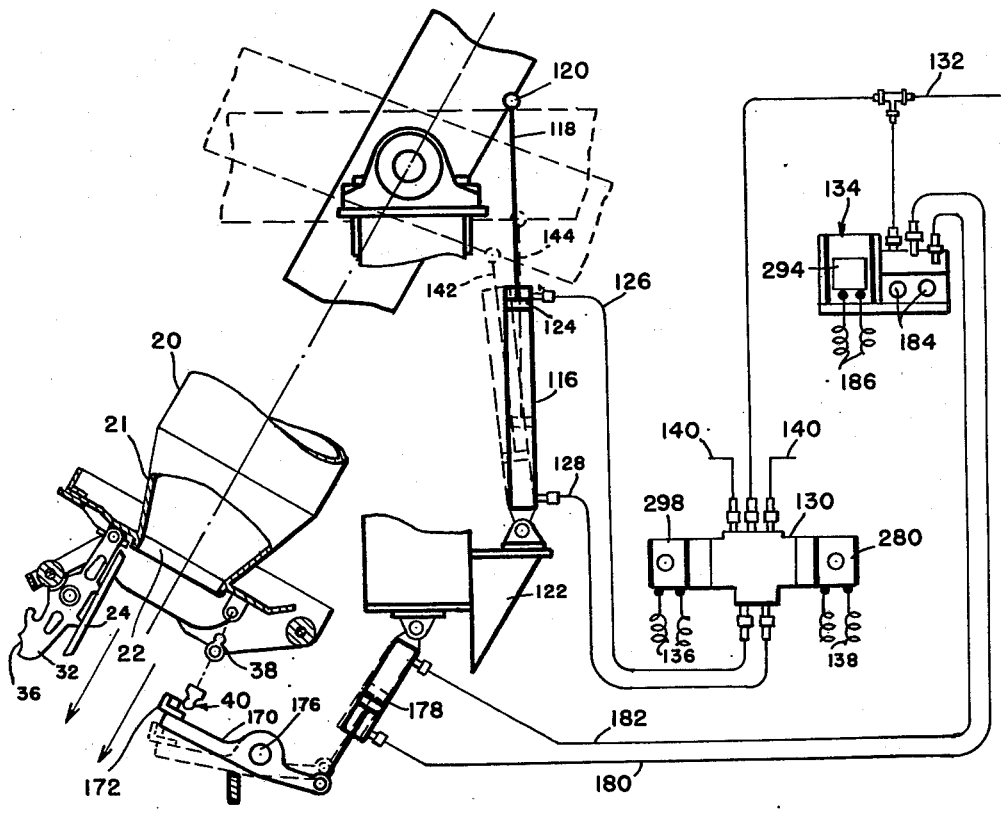
Fig. 8 is a schematic showing of the air supply system used for operating the pneumatically actuated apparatus of the puffing gun.

The dotted line position of the cylinder at 142 in Fig. 8 indicates the position of the puffing gun when the cereal product is loaded into the gun barrel. To tilt the gun to processing position the piston and cylinder move to the dotted line position 144, which is accomplished by the admission of air to line 126 and the venting of line 128 until the gun barrel reaches the horizontal position. To move to firing position which is the solid line position of Fig. 8, additional air is fed into line 126 and line 128 is additionally bled. In order to rapidly move the barrel between these positions and accurately stop the barrel when it has reached the positions, devices are provided which provide a certain and accurate stopping position for the barrel.

When the barrel is in loading position a bracket 146, secured to the gun carriage, rests against one face 147 in the manner shown in Fig. 4. With this positive stop, the air cylinder cannot accidentally move the barrel beyond the correct position. When the gun moves to processing position, a latch 150 will drop into a notch 152 in a disk 154 which is secured to the side member 76 of the gun frame. The latch 150, Fig. 2, is pivotally hung on a bracket 156 secured to the vertical standard 102 and a compression spring 158 is held upwardly by adjustable holder 160 which forces the latch up into the notches on the disk 154. The holder 161 is also mounted on the vertical standard 102. The latch, shown in detail in Fig. 3, has both the front and rear faces 162 and 164 curved so that, although it is held firmly into the notch of the plate 154 it will ride out of the notch when the disk is forcibly rotated with the tilting of the gun. Additional notches 166 and 168 are provided for the latch to engage when the gun is in firing and loading positions, respectively, although the position of the gun is fixed in these positions by the stops. When the gun moves to firing position the bracket 74 strikes the face 149 of stops 148 which are the same stops provided for the gun when it moves to loading position. Thus it will be seen that the pneumatic cylinder (Fig. 6) can move the gun rapidly from processing to firing position and at the proper position the bracket 74 will stop the stops 148 stopping the gun in the proper position.

It is important that the gun be properly tilted when in firing position because of the tripping mechanism which releases the lid while the gun is rotating. This mechanism is fully disclosed in the afore-mentioned co-pending application. In order to keep the cereal products tumbling within the gun barrel and to aid their being discharged from the barrel after firing, the copper is opened while the gun continues to rotate. To achieve the tripping during rotation, a latch release arm 170, shown in the non-tripping position in Figs. 1, 4 and 5, moves to the tripping position of Fig. 6. In this position the tripping head 172, which has a cam surface 174, is struck by the rounded end of the latch 40. As shown in Figs. 4 and 8, this cams the latch member outwardly, moving the boss 42 out of the notch 36 on the yoke 32, thereby releasing the lid. As soon as the lid has begun to open, the high internal pressure within the puffing gun barrel forces it outwardly, throwing it away from the opening and permitting the contents to expand to atmosphere.

The rapidity with which the interior is vented to atmosphere has an effect on the puffing or the amount of the enlargement of the cereal product. With a slow pressure release the puffing of the grain will be unsatisfactory and a fast release is highly desirable. With the narrowing of the gun barrel by the use of the tapered end 21, the size of the opening 22 and hence the cover size required is reduced. This permits the use of a lighter weight cover than if the opening were of the same diameter as the pressure chamber and with a cover of low inertia the speed of opening is rapid.

As is shown in Figs. 1 and 8, the tripping arm 170 is supported on brackets 172 and 174 on the member 114, being pivotally mounted on the pin 176 which extends through the brackets. The pivotal movement of the arm from the non-tripping dotted line position of Fig. 8 to the solid line tripping position is controlled by the pneumatic cylinder 178. This cylinder is supplied air through lines 180 and 182 which are connected to the lower and upper ends of the pneumatic cylinder and the air supply to these lines is controlled by the valve 134. The valve is an electric control valve of the type well known to the art, which alternately feeds air pressure to the lines 180 or 182, bleeding the remaining line through the outlets 184. Electricity for the control of the valve is supplied through leads 186.

Since the lid of the gun barrel is thrown open with considerable force, a shock bumper must be provided to absorb the force of the lid. The gun barrel is rotating at the time the lid is released and the lid is hingedly attached to the barrel which requires that the shock-absorbing means be properly oriented with respect to the lid when it is released. Because the barrel and the cover rotate after firing, a recoil mechanism must be provided which will not interfere with the rotating lid and damage the mechanism as it rotates. To achieve proper orientation of a recoil mechanism and obviate chances of the lid catching on other mechanism, I have provided a shock-absorbing mechanism which revolves with the gun barrel. The recoil mechanism is secured to the flange 28 (Fig. 1) which is provided with a pair of shaped side webs 188 and 190 projecting from it. Pivoted to these side webs is a yoke 190 carrying a resilient bumper 192 against which the shoes 194 on the cover yoke strike. Yoke 190 is pivotally mounted on pins 196 and 198 which project from the web members 188 and 190.

Arms 200 are secured to the yoke and pivot with the yoke on the pins 196 and 198. The free ends of the arms connect to the piston rods 204 of shock-absorbing cylinders 206 which are fixed to the side webs 188 and 189. These shock-absorbing cylinders are of the conventional type which retard the movement of the piston arm in one direction and permit rapid return in the other direction by the use of a valved oil escapement. Tension springs 208 connect between pins 210 on the yoke and bosses 211 which extend from the side flanges 190 to return the yoke to its normal position after it has been struck by the lid. To absorb the shock of the latch after it has been thrown back by the lid, a resilient bumper 212 is secured between projecting ends from the ends 188 and 190.

Thus it will be seen that the cover may be thrown back from the gun barrel opening and the force of the cover absorbed by the shock-absorbing mechanism. The mechanism will always be in the proper place for the cover to strike it, rotating the barrel and there is no chance of the cover catching on any projecting members to damage the parts.

To direct the puffed cereal product downwardly as it is expelled from the puffing gun barrel and prevent it from being deflected laterally where it will strike the shock-absorbing mechanism and become contaminated, a guiding shield is placed around the opening. The shield is comprised of outwardly extending baffles 213 on each side of the opening. The baffles prevent the cereal product from flying out of the opening laterally and also prevent an inrush of air from the side of the opening as the pressure wave of the release of steam from the interior of the gun passes. The annular baffles 213 are separated at the top and lower edges, as shown in Fig. 1, to allow for the lid-supporting yoke 32 which must extend beyond the sides of the opening to support and latch the lid. The baffles 213 are suitably secured around the opening of the gun barrel such as by filtering.

The opening of the interior of the gun barrel to atmosphere by opening the lid is accompanied by a violent egress of the steam within the chamber. This causes a large reactionary component of force acting toward the rear of the gun barrel which subjects the parts supporting the barrel to severe strain. In order to relieve this strain and to reduce the severity of the shock to the more delicate operating mechanisms, the entire gun carriage and its supporting stand are mounted in a shock-absorbing mechanism. The shock-absorbing mechanism permits the entire assembly to recoil a distance, yet holds the mechanism rigid during the operating periods.

To permit the stand to slide rearwardly when the gun is fired, the base members 106 and 108 are slidably positioned in channeled irons 214 and 216 (Fig. 1). These irons are mounted on a foundation such as the beams 217 on the crossbar 218 which extends across the support channels in notches 220 and is secured at its ends to the base channels 106 and 108. The crossbar 218 normally abuts against the front edge 222 of the notch 220 (Fig. 11), being held there by the rear recoil springs 224.

The rear recoil springs (Figs. 1 and 12) push up against the channel iron 115 which is connected across the rear ends of base channels 106 and 108 to hold the gun assembly forward. The cross channel 115 slides in a notch 228 in the support 216. The forward edge of the notch is strengthened by a plate 230 bolted to the lip of the channel. A bracket 232 is bolted to the cross channel 226 and keeps the gun base oriented with respect to the channels 214 and 216 in which it slides. A similar bracket, not shown, is mounted to slide against the other channel 214, thus preventing the base from moving sideways. The spring 224, which abuts against the cross channel 115 also abuts against a web 234 welded across the lips of the channel 216, with reinforcing fins 236 between the channel base and the web. A pin or bolt 238 extends through the center of the spring through holes in the cross channel 226 and the web 234. It will be seen from the detail of Fig. 6 and from Fig. 12 that as the gun is fired the horizontal component force will force the gun and its base rearwardly and the horizontal component shock of this rearward movement will be absorbed by the spring 224, permitting the gun to recoil. After the force of the gun firing has been exerted, the springs 224 will return the gun to normal position.

Because the gun opening faces downwardly at firing position, the vertical component of reaction force is important. To reduce this shock, vertical recoil springs 240 and 242 are positioned at the front of the gun base. These springs, shown in Fig. 1 and in detail in Figs. 9, 10 and 11, have a pin 244 which extends through the center and a washer 246 is held against the spring by nuts 248. The lower end of the pin has an eye through which extends a bolt 250 to attach the spring to the base member 214 or 216. The lower end of the spring 246 rests on a shelf 252 with strengthening webs 254 welded to the side of the base member 108. It will be seen that as the gun fires the vertical component of force tends to lift the forward end of the gun and this shock is absorbed by the spring 242. As the front end of the gun lifts it pivots about the back end of the base and a front shock absorbing spring is positioned at a slight angle so that it will be tangential to the curve of the arc inscribed by the front end of the gun base when it raises with recoil. Thus the combination of rear and forward recoil springs take up the shock of the firing of the gun and protect the parts from damage. The channels 214 and 216 to which the shock-absorbing springs are secured rest on any suitable floor attachment, shown in Fig. 1 in the form of a pair of I-beams 256 which rest on a platform 258.

From the foregoing description, the operation of the gun will be apparent. The improved gun, which is capable of being constructed in sizes for large capacities, is well qualified for being used as a manually operated gun, or as an automatic gun such as that disclosed in the aforementioned co-pending application.

Figure 7:
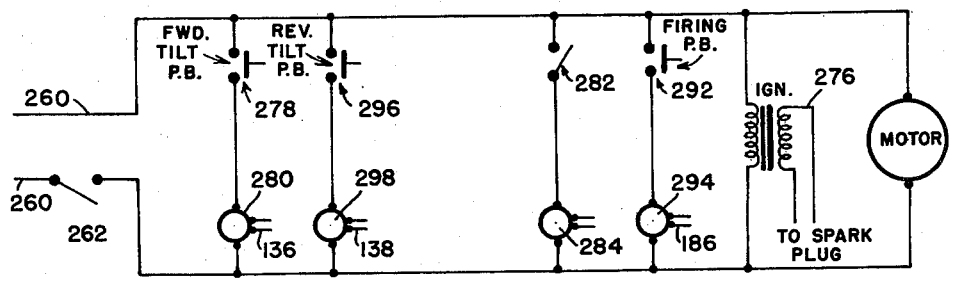
Fig. 7 is a schematic view of a simplified wiring circuit which may be used for the operation of the gun.

For purposes of illustration, a simplified semi-manual electrical operating system is disclosed. The system requires that the operation of motors be operated by manual switches at the appropriate time and period. In Fig. 7 is shown the wiring diagram for the simplified operating mechanism. Current is supplied through suitable leads 260 from the supply line. A main control switch 262 is closed to begin the operation which completes the circuit to the motor 264 which rotates the gun barrel. As shown in Fig. 4, this motor is suitably supported from the rear crossbar of the U-frame and through a belt 266 carried on its pulley 268 and running over pulley 270 which drives the worm gear 272. The worm drives the gear 274 which is secured on the shaft 56 (Fig. 15) of the gun barrel to rotate the barrel and to cause the product to be tumbled within and prevent burning.

Returning to Fig. 7, the closure of the main control switch 262 also completes the circuit to the ignition system 276 which causes a sparking of the sparkplug. At this point the push button switch 278 is closed, operating a relay 280 to close the circuit to the air control valve 130 (Fig. 8). This causes admission of air to the cylinder 116, moving the cylinder and barrel from the dotted line position of 142 to the solid line position of 144, which is the processing position of the gun.

At this point, the gun and contents are ready to be heated. This is accomplished by closing the manual switch 282 completing the circuit to the solenoid 284 which controls the gas valve in the supply line to open the valve and cause the flow of gas to the burners. The burner switch is permitted to remain closed to continue the processing of the product until the proper pressure is reached within the gun barrel. The pressure is indicated by means of a pressure gauge 286 connected to the pressure supply pipe 288 which extends through the bore 290 through the center of the gun supporting shaft 56. As soon as the pressure has reached the desired amount, the switch 282 is opened to terminate the supply of gas and extinguish the burners, and the gun is tilted to the firing position by the closing of the push button 278. After the gun tilts to firing position through the action of the air cylinder 116, the gun is fired by pushing the firing push button 292, closing the circuit of the solenoid 294, thus operating the valve 134 (Fig. 8) to move the pivotal tripping arm 170 into the path of the rotating latch arm 40. As the latch arm strikes the camming head 172 of the tripping arm, it is unlatched to release the closure lid 24 to fire the gun. The firing push button 292 is then released permitting the arm 170 to go back to the dotted line position of Fig. 8. After the gun barrel has made a number of revolutions in the firing position to totally discharge the puffed contents, the gun is brought back to loading position. This is accomplished by depressing the reverse tilt push button 296 to close the circuit of the solenoid 298 which operates the air valve 130 and causes the air cylinder 116 to tilt the gun back to loading position. At loading position the gun is again refilled and the cover manually latched whereupon the processing cycle is repeated. The cycle of processing may be accomplished in any desired manner and it is to be understood that the principles of the present invention are directed at achieving an improved and larger puffing gun and are readily adaptable to various modes of operation.

The puffing gun herein disclosed accomplishes an improved product in establishing even heating throughout the entire barrel length and, because the mechanism enables the gun to be in firing position within a very short time after the desired pressure has been reached, the product will be uniform and will be ideal in size and quality. Provision of a gun barrel of increased size does not reduce the efficiency of the gun as its design enables the cover to open rapidly, thereby permitting a rapid drop of pressure and a puffing of good quality. The enlarged gun with the accompanying increase of shock on the mechanism due to firing, will not damage the parts of the mechanism because a shock absorber system has been provided which meets the needs of a puffing gun and which will permit firing with barrel pointing downwardly in discharge position.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A mechanism for puffing cereal products comprising a hollow container in which the cereal product is heated and subjected to pressure, a closure for the container being closed during processing and suddenly opened at the end of processing to release the pressure within the container, a container-supporting shaft projecting axially from the container, said shaft constituting the sole support for the container, a bearing in which the shaft is rotatably journaled for rotation of the gun, a tiltable carriage on which the bearing is mounted for supporting the gun, a burner assembly for heating the contents of the gun being supported on and tiltable with the gun and carriage, means for tilting the carriage to processing and firing positions, and means to open said closure at firing position while the container is still rotating to puff the cereal.

2. A mechanism for puffing cereal products comprising a hollow pressure chamber in which the cereal product is heated in a pressurized atmosphere having an opening through which the puffed product is discharged, a closure lid positioned and latched over the opening during processing of the product, a single supporting shaft projecting axially from the pressure chamber, a journal in which the shaft rotates for rotation of said pressure chamber about its longitudinal axis, means for rotating the pressure chamber during processing and during discharge of the cereal product, and means for unlatching the cover to release the pressure within the chamber to puff the cereal at the end of processing, while the chamber is rotating.

3. A mechanism for puffing cereal products comprising a hollow elongated pressure chamber in which the cereal product is heated and subjected to pressure during processing, said chamber having an opening at one end, a lid latched over the opening to maintain the pressure within the chamber during processing, a shaft projecting axially from the end opposing the opening for rotatably supporting the chamber, a bearing in which the shaft is journaled for rotation, a thrust bearing between said rotation bearing and chamber to withstand the reactive force of the chamber when the lid is open and the pressure is released from the opening, and means for unlatching the cover while said chamber is rotating to puff the cereal products at the end of the processing.

4. A mechanism for puffing cereal products comprising a puffing gun barrel having an opening on one end in which the cereal product is processed by heating under pressure, a releasable lid being latched over the opening during the processing period, a supporting shaft projecting axially from the closed end of the puffing gun for rotatably supporting the barrel, the barrel being unsupported at its open end, a bearing for supporting the shaft, a carriage in which the bearing is secured, means for rotating the barrel, said rotating means being mounted on the carriage, means for tilting the carriage from processing position to discharging position, and means for unlatching the cover while said barrel is rotating to release the pressure wthin the barrel and puff the cereal products at the end of the processing period.

5. A mechanism for puffing cereal comprising a container rotatable about its longitudinal axis in which the cereal product is processed by heating while subjected to a pressure with an opening for filling and discharging the product, a lid for the container being latched over the opening during processing, means for unlatching the lid to permit it to be forced open by the pressure within the container at the termination of processing, and a device for absorbing the shock cushioning the unlatched lid as it is rapidly forced open, the shock absorbing device being supported on the container and being spaced from the lid so as to be engaged by the lid only after a predetermined travel of said lid thereby to avoid hindering the first rapid opening of the lid as it is unlatched.

6. A mechanism for puffing cereal comprising a pressure container in which the cereal product is processed by heating while it is subjected to pressure, the container having an opening for discharging the puffed product by releasing the pressure within the container, a lid positioned over the opening and latched in closed position during the processing of the cereal, means for rotating the container about its longitudinal axis to tumble the cereal product therein, a lid shock-absorbing mechanism secured to the container and rotating therewith so as to be continually oriented with the position of the lid, and means to unlatch the lid at the end of processing position to release the pressure and puff the cereal, the lid spaced from the shock-absorbing means in closed position and striking the shock-absorbing means when unlatched to absorb its inertia and stop its travel at only the end of its opening movement.

7. A mechanism for puffing cereal comprising a puffing barrel rotatable about its longitudinal axis in which the cereal is processed being subject to heat and pressure, the barrel having an opening through which the puffed cereal is discharged, a lid hinged to the barrel to be pivotable between a closed position against the barrel opening and in open position away from the barrel opening, latch means for holding the lid over the opening during processing to maintain the pressure within the barrel, means for tilting the barrel from the processing position to a cereal discharging position with the opening facing downwardly, a shock-absorbing mechansm spaced from the lid secured on the barrel and rotating therewith to be constantly positioned at the open position of the lid so that the inertia of the rapidly opening lid will be absorbed as the lid strikes the mechanism only at the end of its travel, and means for tripping the latch to open the lid and release the pressure within the container to puff the cereal product.

8. A mechanism for puffing cereal comprising a container rotatable about its longitudinal axis in which the cereal is treated previous to puffing by being heated in a pressurized atmosphere and having an opening through which the cereal is discharged to atmospheric pressure, means to continuously rotate the container during processing and release periods, a lid pivotally hinged on the barrel and latched over the opening during processing, means for releasing the lid from its closed position at the termination of the processing period while the container is being rotated, and a lid shock-absorbing mechanism also mounted on the container to be constantly oriented with the lid and to be engaged by the lid to absorb its energy only after it has been forced open by the pressure within the container.

References Cited in the file of this patent

UNITED STATES PATENTS

| | | |
|---|---|---|
| 428,209 | Hotchkiss | May 20, 1890 |
| 1,878,782 | Kirn | Sept. 20, 1932 |
| 2,008,860 | Gardner | July 23, 1935 |
| 2,086,266 | Heue et al. | July 6, 1937 |
| 2,132,987 | Kiewit | Oct. 11, 1938 |
| 2,148,728 | Charnley | Feb. 28, 1939 |
| 2,259,802 | Crosby et al. | Oct. 21, 1941 |
| 2,279,868 | Hayden | Apr. 14, 1942 |
| 2,598,242 | Ernest | May 27, 1952 |
| 2,731,904 | Van Arsdell et al. | Jan. 24, 1956 |